3,117,031
METHOD AND APPARATUS FOR COUNTER-
CURRENT WASHING OF SOLID PARTICLES
SUCH AS CRYSTALS
Kenneth F. Griffiths, 47 Branch Brook Place, Newark,
N.J., assignor of one-half to John L. Kerby, Larchmont, N.Y.
Filed May 9, 1960, Ser. No. 27,864
14 Claims. (Cl. 134—25)

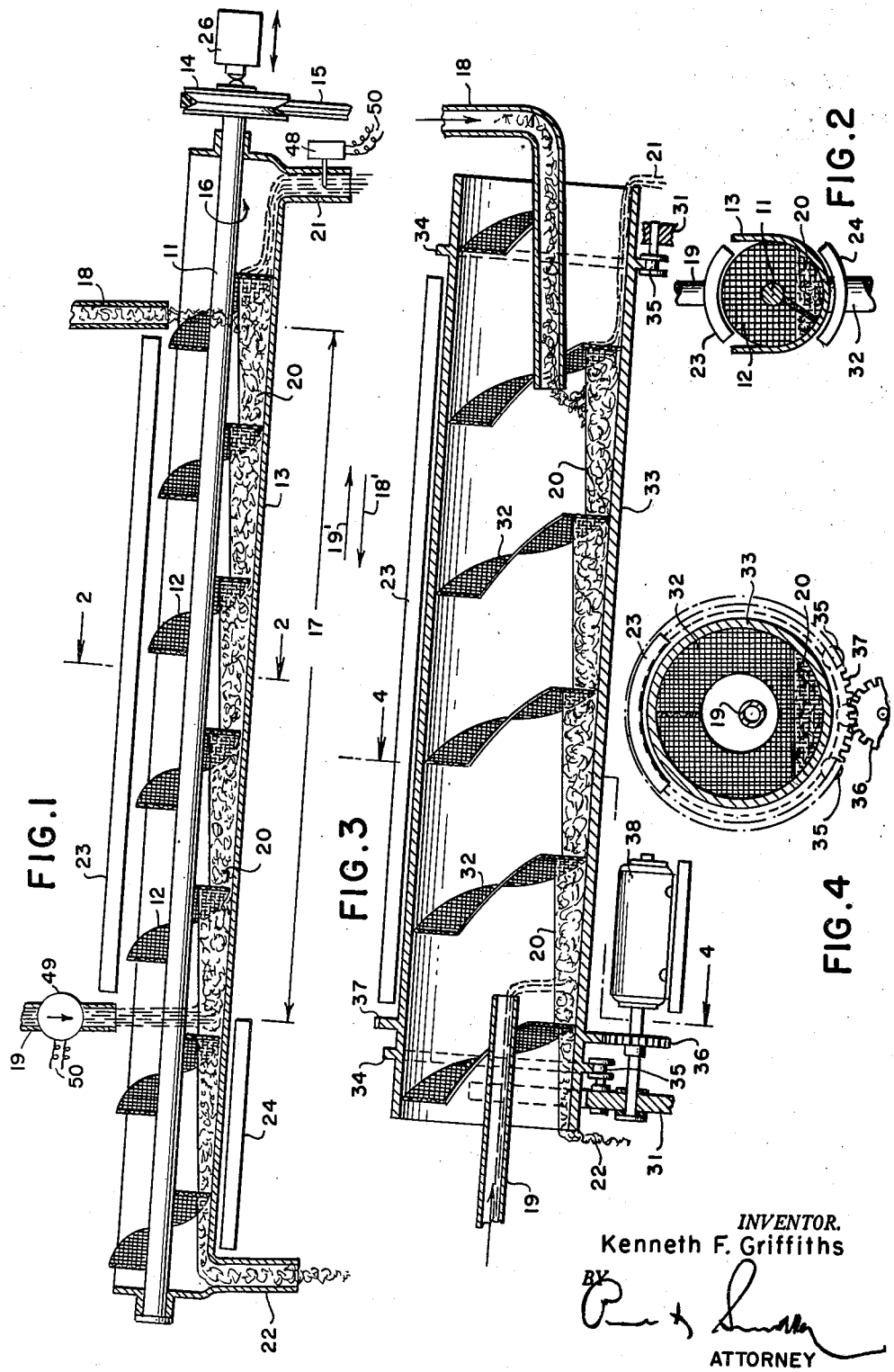

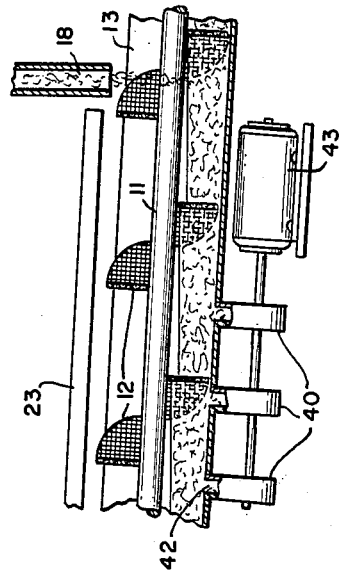
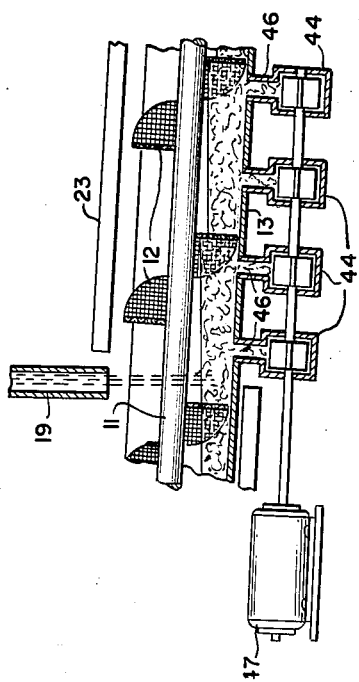
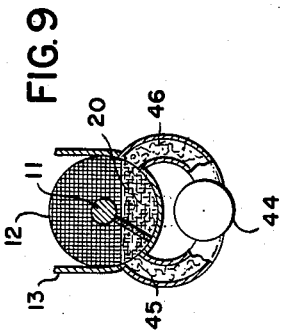
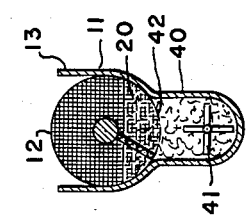
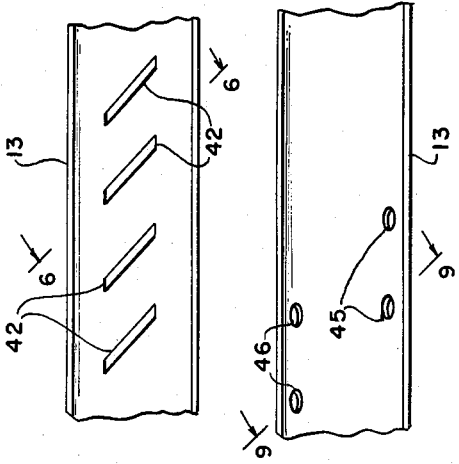
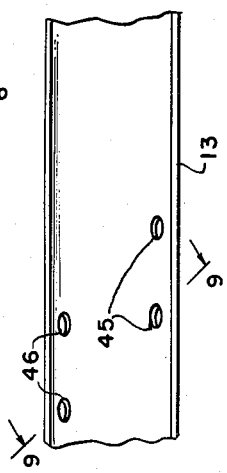
INVENTOR.
KENNETH F. GRIFFITHS
BY
ATTORNEY United States Patent Office 3,117,031
Patented Jan. 7, 1964

My invention is an improved method and apparatus for washing solid particles. More specifically, my invention is an improved method and apparatus for effecting countercurrent washing of solid particles with a suitable wash liquid.

In most cases the apparatus and method of my invention is employed to wash mother liquor off the surface of crystals. In such cases, the wash liquid feed may be either of the same composition as the crystal material being washed or be a solvent suitable to wash the mother liquor from the surface of the crystals.

It is well known that in many cases in which crystals are formed in a rather impure mother liquor, the solid portion of each individual crystal is very pure. Total separation of such crystals from the mother liquor would produce a very pure product. In actual practice total separation of crystals from the mother liquor wetting said crystals is difficult or impossible. Even after a crystal slurry is centrifuged with 2,000 G's of force, there is a considerable amount of mother liquor that remains on the surface of the centrifuged crystals.

Numerous methods have been proposed to wash the adhering mother liquor from the exposed surface of crystals. One of these methods involves the compression and ramming of the crystals through a cylindrical crystal purification column in which the compacted cylindrical crystal-cake is moved countercurrent to a flow of suitable reflux liquid. Such a method has the disadvantage that intimate contact of the crystals and the wash fluid is not achieved in the purification column. Another method involves the use of a series of vats which contain progressively purer wash liquid as one would go from the impure to the pure end of the system. Crystal feed is charged into the least pure tank and mixed with the wash liquid therein to form a slurry. Slurry from the least pure vat is pumped through a continuous filter where the crystals are separated from the wash liquid and dumped into the second to least pure vat. The filtrate is returned to the least pure vat. In a like manner crystals are intimately mixed with the wash liquid of progressively purer vats and separated therefrom and passed to the next purer vat. Reflux liquid flows from vat to vat in the opposite direction of crystal motion. Such a system as this requires the use of numerous apparatus in the form of pumps and continuous filters.

Still another known method involves the mechanical transport of crystal material on a suitable screen surface in countercurrent motion to the flow of a suitable wash liquid. The main disadvantage of this general procedure is that the screen usually becomes plugged with fresh crystal deposits and the crystal cake becomes impervious to the flow of wash liquid.

It is an object of my present invention to avoid the disadvantages of the known methods and apparatus and to provide an improved apparatus and method adapted to effect the countercurrent washing of solid particles such as crystals with a suitable wash liquid.

Another object of my invention is to provide an improved apparatus and method for effecting the countercurrent washing of crystal particles with a wash liquid of substantially the same composition as the melted crystal product.

A further object of my invention is to provide a mechanical method and apparatus adapted to effect the countercurrent washing of crystals with a suitable wash liquid such that the crystals are maintained in an agitated slurry during the washing operation thereby insuring that there is a very intimate contact between the surface of each crystal and the wash liquid throughout the entire wash zone.

An additional object of my invention is to provide a mechanical method and apparatus adapted to effect the countercurrent washing of crystals with a suitable wash liquid such that the filter screens of the apparatus do not become plugged with crystal deposits even in cases in which the pure end of the wash zone is warmer than the impure end.

Still a further object of my invention is to provide very simple apparatus adapted to effect very efficient countercurrent washing of solid particles with a suitable wash liquid.

The said and other objects and advantages may be achieved by my present invention in which a countercurrent wash zone is maintained in a screw type conveyor apparatus which has the following characteristics:

(1) The flights of the screw conveyor are comprised of porous or other filtrating material such as screening adapted to allow wash liquid but not all the crystal particles to pass through it;

(2) The screw conveyor fits within a circular trough adapted to hold individual pools of liquid formed between and separated by the flights of the screw conveyor, said pools forming the wash zone;

(3) The screw conveyor and trough is inclined at an angle with respect to the horizon, the pure end of the wash zone being higher than its impure end;

(4) Crystal particles are conveyed upward through the wash zone by the rotating screw conveyor and the net flow of wash liquid is downward through the wash zone;

(5) A suitable pure wash liquid is introduced to the upper portion of the wash zone;

(6) Relatively impure wash liquid filtrate is withdrawn from the bottom of the wash zone;

(7) Washed crystal particles are withdrawn from the upper portion of the wash zone;

(8) Unwashed crystal particles are introduced to the bottom of the wash zone;

(9) The screw conveyor is rotated at a controlled rate in a direction such that the individual pools of slurry are screwed upward.

The above described apparatus for countercurrent washing of solid particles with a suitable wash liquid is operated as follows:

(1) The rate of rotation of the screw conveyor is maintained slow enough so that the wash liquid filtrate filters downward through the wash zone faster than the screwing action of the conveyor transports it upward. Thus, the slower the rotation of the screw conveyor, the faster wash liquid will flow downward through the wash zone and the less would be holdup of wash liquid in the wash zone, and the shallower will be the pools.

(2) The rate of rotation of the screw conveyor is maintained fast enough so that the solid particle feed is transported upward through the wash zone at a great enough rate to prevent an excessive hold up of particles in that zone. The faster the rate of rotation of the screw conveyor, the faster the particles will be transported upward through the wash zone and the less will be the holdup of particles therein. If the holdup of particles is too great in the wash zone, the slurry therein would become too thick.

(3) The optimum rate of rotation of the screw conveyor for any given combination of solid particle feed rate and wash liquid feed rate is such that the ratio of the holdup of liquid over the holdup of solid particles is a maximum in the wash zone, thereby resulting in the thinnest slurry possible in the wash zone for the given feed rates. I have found that if optimum rotational speed of the screw conveyor is maintained and the flow rate of particles to the wash zone is reduced, the slurry becomes much thinner because the holdup of solid particles in the wash zone diminishes.

In all cases it is desirable that the combination of the rate of conveyor rotation, crystal feed rate, wash liquid feed rate and slope of the conveyor be selected such that there would be approximately 10% solids and 90% wash liquid in each of the pools in the wash zone. Too thick a slurry would tend to make it difficult to keep the porous for example screened flights from binding and too thin a slurry would indicate that the apparatus is operating below its rated production rate.

In all cases it is desirable that there be as small as possible clearance between the outside diameter of the screw conveyor flights and the internal diameter of the trough. If the clearance is too great, too many of the solid particles would leak downhill through the wash zone.

There are two general embodiments of apparatus applicable for this invention. One embodiment comprises a porous screw conveyor rotating within a stationary tubular box or casing, or in a stationary open trough. Another embodiment comprises a porous screw conveyor within and attached to a rotatable tubular box or casing. As the screw conveyor rotates the individual pools of slurry are moved uphill and the wash liquid drains through the porous flights downhill.

In all cases, the porous for example screened screw conveyor may be kept free of binding with particles by the application of vibration to it. Any suitable method of applying vibration to the screw conveyor may be employed, for example, vibration may be produced by an electric high frequency vibrator attached to the apparatus, or by a mechanical device of conventional design imparting vibrations of lower frequency and greater amplitude. The optimum frequency and amplitude would naturally depend upon the nature and particularly the size of the solid particles being washed.

In cases in which the apparatus is employed for the washing of crystals with either a suitable solvent or with molten crystal material, the screw conveyor screen or the like is often of a mesh coarse enough to retain only the coarser crystals so that only the coarser crystals are conveyed upward whereas smaller crystals pass through the porous flights with the wash liquid. In such case the smaller crystals in the wash zone have a chance to grow during their passage downward to a size where they will be retained on the screen or the like and be conveyed upward to leave the apparatus with the washed crystal product. Thus the apparatus of my present invention may serve as both a crystal washing and a crystal growing device.

The unwashed crystals fed to the lower end of the wash zone may be either dry or be thoroughly wet with mother liquor or be in a slurry of mother liquor. If the crystal fed is in mother liquor slurry, the apparatus would serve to remove the crystals from the mother liquor and wash the last traces of the mother liquor from their exposed surfaces.

If the crystals are being washed with a suitable solvent, I prefer that the temperature of the wash zone be maintained as low as possible. However, the temperature must be above the freezing point of the wash liquid and high enough to allow the wash liquid to dissolve the impurities from the surface of the crystals.

When the apparatus is being employed in situations in which the wash liquid feed is of substantially the same composition as the melted crystal product, a temperature gradient establishes itself between the pure upper end and the impure lower end of the wash zone. The temperature in the lower end is substantially equal to the temperature of the unwashed crystal feed. The crystals are heated to their melting point temperature as they pass upward through the wash zone in counterflow to the wash liquid and the wash liquid is accordingly chilled as it passes in the opposite direction. There is a tendency for wash liquid to crystallize as it flows downward and is being cooled not only on the crystals being passed upward but on the screw conveyor flights as well. Such crystal deposits tend to block the passage of wash liquid downward through the wash zone and make the apparatus impractical to operate. To avoid this drawback, I apply heat to the porous flights of the screw conveyor whereby undesirable crystal formation on them are eliminated. I have found that the best method of applying such heat is to heat the portion of the flights above the liquid level of the pools for example by thermal radiation from a hot radiator; if the screw conveyor rotates in a stationary semicircular trough, infrared heaters situated above the screw conveyor may impart heat to the portion of the flights above the liquid level. However, any suitable method of heating the flights may be employed. If the apparatus comprises a porous screw conveyor arranged within and attached to a rotatable cylindrical box or casing, the flights of the screw conveyor do not reach the center of the box or casing leaving a central hollow core in which a tubular radiant heater may be located.

When the wash liquid is substantially the same as melted washed crystal product, the portion of the trough submerged in the wash liquid within the wash zone portion of the apparatus may be adiabatic or be slightly heated. However, the apparatus and method taught in this invention may be operated in cases in which heat is either put into or taken out of the wash liquid in the wash zone.

Also, when the wash liquid feed is of substantially the same composition as the melted crystal product, the flow rate of wash liquid feed to the top of the wash zone may be adjusted such that the temperature of the wash liquid filtrate leaving the bottom of the wash zone is just above the temperature of the crystals entering the bottom of the wash zone. The higher the flow rate of wash liquid feed to the top of the wash zone, the higher is the temperature of the wash liquid filtrate leaving the bottom of the wash zone. If the flow rate of the wash liquid feed to the upper end of the wash zone is too low, all of it may freeze upon the crystals in the wash zone and no wash liquid filtrate would leave the lower end of the wash zone. It is necessary that at least some wash liquid filtrate leave the lower end of the wash zone to make the process effective for separating surface impurities from the crystals. An optimum flow rate of wash liquid feed to the wash zone may be maintained by controlling said rate with a thermostat that indicates the temperature of the wash liquid filtrate leaving the lower end of the wash zone. If the temperature of the wash liquid filtrate were too high, the thermostat would signal for a smaller flow rate of wash liquid feed to the upper end of the wash zone. On the other hand, if the temperature shown by the thermostat became too low, the wash liquid feed flow rate would be increased.

In cases in which the wash liquid feed to the wash zone is of substantially the same composition as the melted washed crytal material, either some or all of the washed crystal particles may be melted and some of the resultant melt be employed as wash liquid feed. In most cases in which this is done, a crystal melting zone may be maintained in the upper end of the conveyor apparatus. Some of the melt would flow downward along the bottom of the screw conveyor trough and serve as wash liquid feed to the upper portion of the wash zone. The washed crystal material may be discharged from the melt zone as either a slurry (mixture of crystals and molten crystal material) or as liquid. The slope of the central axis of the screw conveyor with respect to the horizon and the rate of rotation of the screw conveyor would be adjusted to cause the optimum flow rate of wash liquid to pass through the crystal wash zone. If the melting zone is in the conveyor trough, the amount of heat imparted to it may be controlled by a thermostat indicating the temperature of the wash liquid filtrate leaving the lower end of the wash zone. If the wash liquid filtrate is too cold, more heat would be imparted to the melting zone. On the other hand, if the wash liquid filtrate were too warm, less heat would be imparted to the crystals in the melting zone.

The objects of my invention will be more fully understood from the following specification when read with the accompanying drawing in which several embodiments are illustrated.

In the drawing

FIG. 1 shows a longitudinal sectional view of one embodiment of my new apparatus which includes a screw conveyor made of a filtrating material and rotatably mounted in a stationary trough;

FIG. 2 shows a cross section thereof taken along line 2—2 in FIG. 1;

FIG. 3 shows a longitudinal sectional view of another embodiment of my new apparatus which includes a single-ribbon conveyor attached within and to a rotatably mounted tubular box or casing; and FIG. 4 shows a cross section thereof taken along line 4—4 in FIG. 3;

FIG. 5 shows a partial longitudinal sectional view of an improved embodiment as shown in FIGS. 1 and 2;

FIG. 6 shows a cross section thereof along line 6—6 in FIG. 7;

FIG. 7 shows a fragmentary plan view of the conveyor trough, the conveyor screw being removed for better showing;

FIG. 8 shows a partial longitudinal sectional view of another improved embodiment as shown in FIGS. 1 and 2;

FIG. 9 shows a cross section thereof along line 9—9 in FIG. 10; and

FIG. 10 shows a fragmentary plan view of the conveyor trough, the conveyor screw being removed for better showing.

As shown in FIGS. 1 and 2 my new apparatus includes screw conveyor means comprising a shaft 11 rotatably mounted in an inclined position and provided with a helicoidal spiral 12 which rotates as tightly as possible in a conformingly inclined housing such as trough 13 or a cylindrical container. The shaft 11 with spiral 12 is rotated in controllable manner in the direction of arrow 16 by pulley 14 and belt 15 driven by a not shown motor. The spiral 12 of the conveyor is adapted to act as a filter and therefore is made of a porous or screening material for example from perforated metal sheet covered by a screen of suitable mesh to contain solid particles such as crystals being washed. Unwashed crystal feed is introduced into the apparatus at the lower end of the wash zone 17 through conduit 18. Wash liquid feed, heated if required, is introduced into the apparatus at the upper end of the wash zone 17 through conduit 19. The rotating conveyor moves the unwashed crystal feed in the direction of arrow 18' from the lower end of the wash zone 17 towards its upper end while wash liquid flows in countercurrent in the direction of arrow 19' forming between the individual flights of spiral 12 separated pools 20 composed of a mixture of wash liquid and crystal feed. Wash liquid is discharged from the trough 13 through drain conduit 21 and the washed crystals or other solids reaching the upper end of the trough 13 are discharged through the conduit 22. A heater 23 may be provided to heat the upper i.e. not submerged portion of the spiral 12 and another heater 24 may be provided at the upper end of the trough 13 outside the wash zone 17 should it be desired to melt some or all washed crystal material before it reaches the discharge conduit 22. Also a vibrator 26 acting upon the conveyor shaft 11 may be provided to prevent sedimentation of material upon the conveyor spiral 12. Additionally, a heat measuring instrument 48 may be provided to measure the temperature of the filtrate leaving the apparatus through the conduit 21; this instrument 48 is electrically connected by wires 50 to a control valve 49 in the conduit 19 to control the flow rate of the wash liquid passing therethrough into the apparatus.

The apparatus described before operates as follows:

While conveyor shaft 11 is rotated as indicated by arrow 16 unwashed crystal feed is introduced through conduit 18 into the inclined stationary trough 13 and is therein moved upward in the direction of arrow 18'. Wash liquid introduced into the trough 13 through conduit 19 flows downward in the direction of arrow 19' passing through the permeable flights of the conveyor spiral 12. Separated pools 20 composed of a mixture of wash liquid and crystal feed will accumulate between the individual flights of the conveyor spiral 12 and these pools will move upwards in the trough 13 through the wash zone 17 located between the said conduits 18 and 19 and during this upward movement the crystals will be gradually filtered so that washed crystals will reach the discharge conduit 22. The rotational speed of the conveyor may be so adjusted that the rate of draining wash liquid flowing in the direction of arrow 19' is greater than the rate at which the pools 20 move upward in the direction of arrow 18'. If desired the crystal melting heater 24 may be operated to melt enough of the washed crystal material to provide either some or all of the wash liquid feed for the wash zone 17. Also heater 23 may be operated to heat the conveyor spiral 12 and thus to prevent wash liquid from freezing thereupon. Vibrator 26 when operated increases the draining efficiency of the permeable spiral flights and keeps them from clogging with crystal material.

Another embodiment of my new apparatus is shown in FIGS. 3 and 4. The screw conveyor means in this embodiment consists of a cylindrical casing 33 in inclined position and a ribbon spiral 32 located within said casing and attached to the inner surface thereof. The casing 33 resting with rims 34 upon rollers 35 is rotated by the motor 38 by means of the pinion 36 and the engaging gear rim 37. The said rollers 35 and the shaft of the motor 38 and the pinion 36 are rotatably mounted upon the apparatus frame 31. As in the first described embodiment unwashed crystal feed or the like is introduced through the conduit 18, wash liquid through conduit 19, and separated pools 20 containing liquids and crystals are formed between the individual flights of the ribbon spiral 32. Washed material leaves the casing 33 at 22 and used wash liquid leaves at 21. Heater 43 imparts heat to the ribbon spiral 32 to prevent wash liquid from freezing or crystallizing thereupon. It will be well understood that this apparatus operates substantially in the same manner as the apparatus shown in FIGS. 1 and 2.

The embodiments shown in FIGS. 5 to 7 and 8 to 10, respectively, are improvements of the embodiment illustrated in FIGS. 1 and 2 and include agitating means by which the slurry in at least one portion of the wash zone 17 may be maintained in a fluidized and equable state and to prevent the formation of crystal cakes on the bottom of the trough.

As shown in FIGS. 5 to 7 agitating or mixing chambers or pockets 40 are attached to the bottom of the trough 13 and communicate therewith. The connecting substantially rectangular opening 42 is in slanted position relative to the axis of trough 13 conforming to the pitch of the conveyor screw 12 (see FIG. 7) in order to prevent the pocket 40 to communicate at the same time with two adjacent pools 20 and to ensure that liquid will flow from pool to pool only through the porous screw flights. Within each pocket 40 is an impeller or agitator 41 driven by motor 43. As each moving pool 20 travels over the opening 42 of one or more pockets 40, the slurry in such pool will be stirred during the time of one revolution of the conveyor screw 12 assuming that such screw has a single flight. If the conveyor screw has more than one flight for example two or three then the time of action would be one half or one third, respectively, of the time of one revolution. The pockets 40 are equidistantly arranged upon the trough 13 in such mutual distance that either one pocket or at the same time several independent pockets communicate with each moving pool 20.

In the embodiment shown in FIGS. 8 to 10 the agitating means consist of a pump 44 which is connected to the trough 13 by the suction pipe 45 and the return pipe 46. The orifices of said pipes 45 and 46 leading into the trough 13 are located as shown in FIG. 10 on a line slanted relative to the longitudinal axis of the trough 13 in the same degree as the pitch of the conveyor screw 12 to prevent, as explained above, that each pump 44 operates upon two adjoining pools 20. This embodiment is arranged and operates substantially on the same principles as the embodiment in FIGS. 5–7 as described above.

In the embodiments illustrated in FIGS. 5–7 and 8–10, respectively, it may be preferred that the width of the slot 42 and the width of the pipe openings 45, 46, does not exceed the width of the rim of the conveyor screw 12.

If, for example, paradichlorobenzene crystals are to be washed, an apparatus substantially shown in FIGS. 1 and 2 may be used. The screw conveyor 12 may be 10 feet long, 10 inches in diameter and have a pitch of 10 inches. The spiral flights may be made of 12 gauge plate perforated with ¼ inch holes and the left hand surface of the flights may be covered with 40 mesh screen. The conduit for introducing the unwashed crystal feed may be located approximately 18 inches from the lower end of the U-shaped trough 13. The uppermost 3 feet of the trough 13 are heated for example by a steam jacket. An electric syntron-type vibrator 26 may make contact with the right hand end of shaft 11 and thereby cause the screw conveyor to vibrate. The slope of the central axis of the conveyor shaft 11 and trough 13 may be approximately 8°.

The run may be started by introducing a flow rate of approximately 100 pounds per hour of paradichlorobenzene crystals formed at 15° C. from a mother liquor comprising a mixture of paradichlorobenzene and orthodichlorobenzene. The temperature of the crystal feed is 15° C. The conveyor shaft 11 is turned at an initial rotational rate of approximately one revolution per minute in a direction such that the crystals are screwed uphill along the bottom of the trough. Most of the mother liquor drains through the permeable flights of spiral 12 and leaves the lower end of the trough 13 through the wash liquid discharge conduit 21. Steam is introduced into a steam jacket forming heater 24. As soon as the crystal material reaches the steam heated portion of the trough, some of it melts and flows down the bottom of the trough from left to right in countercurrent to the crystal motion. The steam supply to the steam jacket is so adjusted that about half of the crystal material is melted. The rotational rate of the screw conveyor is so adjusted that approximately 10 pounds per hour of wash liquid filtrate leave through the drain conduit 21 at the lower end of the wash zone. Sufficient heat is radiated by heater 23 to melt any crystal deposits that would tend to form on the screw conveyor flights or the screen thereon. When equilibrium operating conditions are achieved, the crystals being conveyed upward through the wash zone 17 are heated by heater 23 and by contact with the down flowing wash liquid from 15° C. to 53° C. and the wash liquid passing downward through the wash zone is accordingly chilled from 53° C. to approximately 17° C. As the wash liquid passes through the wash zone 17 it picks up more and more orthodichlorobenzene from the surface of the crystals. Approximately 90 pounds per hour of very pure paradichlorobenzene product is discharged from the upper end of the trough through the discharge conduit 22. This outflowing product may be comprised of a slurry mixture of paradichlorobenzene crystals and paradichlorobenzene liquid. The melting point of the product is approximately 53.1° C., which indicates a very low content of orthodichlorobenzene in the product. If desired, some or all of the heat required to heat the crystals from 15° C. to 53° C. in the wash zone may be delivered by either heater 23 or by an additional heater under the trough 13. It should be noted that the slurry in the pools 20 within the wash zone is rather thin. Therefore, good screen drainage and washing of the crystals is maintained.

It should be noted that the control of the amount of wash liquid that flows through the wash zone and ultimately mixes with the mother liquor and leaves the lower end of the trough may be controlled by the rotational rate of the screw conveyor. Also, the proper flow rate of wash liquid through the wash zone can be ascertained from the temperature of the wash liquid filtrate leaving the lower end of the wash zone and the trough. Therefore, a thermostat indicating the temperature of the wash liquid filtrate leaving the wash zone and the lower end of the trough 13 can control the rotational rate of the screw conveyor which when increased will cut down the flow rate of wash liquid through the wash zone. On the other hand if the thermostat shows a low temperature, the rotational rate of the screw conveyor would be reduced thereby allowing the flow rate of wash liquid through the wash zone to increase.

While specific forms of my invention have been shown and described in detail to illustrate the application of the principles of my invention, it will be well understood that the same may be otherwise practiced and embodied without departing from said principles.

What I claim as my invention is:

1. The method of countercurrent washing or refining of solid particles such as crystals comprising the steps of introducing solid particles to the lower portion of the wash zone within an inclined screw conveyor means having liquid permeable flights; introducing wash liquid to the upper portion of said wash zone; maintaining pools composed of a mixture of the upward moving solid particles and of the downward filtering wash liquid between the individual flights of the screw conveyor means; rotating said conveyor screw in a direction to move said solid particles upward through the wash zone; maintaining the rotational speed of said conveyor screw so that wash liquid filters downward through the filtering screw flights faster than said pools are moved upward; discharging solid particles beyond the upper portion of the wash zone; and discharging the liquid filtrate beyond the lower portion of the wash zone.

2. The method of countercurrent washing or refining of crystals or the like comprising the steps of introducing crystals to the lower portion of the wash or refining zone within an inclined conveyor screw apparatus having liquid permeable flights; rotating the conveyor screw to move the crystals in upward direction; melting the crystals in a melting zone beyond the upper portion of the wash zone; permitting part of the crystal melt to filter downward through the screw flights; maintaining pools composed of the down flowing crystal melt and of the upward moving crystals between the individual flight portions of the conveyor screw; discharging washed crystals beyond the crystal melting zone; and discharging any remaining crystal melt beyond the lower end of the wash zone.

3. The method according to claim 1 wherein the flow rate of the wash liquid introduced to the upper portion of the wash zone is controlled by the temperature of the liquid filtrate leaving the wash zone.

4. The method according to claim 2 wherein the heat imput to the crystal melting zone is controlled by the temperature of the crystal melt leaving the wash zone.

5. The method according to claim 1 wherein the mixture in at least one pool is agitated.

6. The method according to claim 2 wherein the mixture in at least one pool is agitated.

7. An apparatus for countercurrent washing or refining of solid particles such as crystals comprising in combination inclined screw conveyor means including a rotatably mounted screw composed of a plurality of flights made of liquid permeable material, and a housing embracing said screw at least partially to form a trough extending lengthwise thereof; said conveyor means adapted to contain individual pools between the flights over the whole length of the screw; a conduit for solid particles delivering the same to the conveyor means near its lower end; a conduit for wash liquid delivering the same to the conveyor means near its upper end; driving means to rotate the screw at a controllable rate in such direction that the solid particles are moved in upward direction; a discharge for the processed solid particles at the upper end of the conveyor means; a discharge near the lower end of the conveyor means for the wash liquid filtering through the flights of the screw; and vibrating means acting upon said screw.

8. An apparatus for countercurrent washing or refining solid particles such as crystals comprising in combination inclined screw conveyor means including a rotatably mounted cylindrical housing and a ribbon-shaped screw attached to the inner surface thereof, said screw composed of a plurality of flights made of liquid permeable material; said conveyor means adapted to contain separated pools between the flights over the whole length of the screw; a conduit for solid particles delivering the same into the housing near its lower end; a conduit for wash liquid delivering the same into the housing at its upper end; driving means to rotate the housing at a controllable rate in such direction that the solid particles are moved in upward direction; a discharge for the processed solid particles at the upper end of the housing; a discharge near the lower end of the housing for the wash liquid filtering through the flights of the screw; and vibrating means acting upon the housing.

9. An apparatus for countercurrent washing or refining of solid particles such as crystals comprising in combination inclined screw conveyor means including a rotatably mounted screw composed of a plurality of flights made of liquid permeable material, and a housing embracing said screw at least partially to form a trough extending lengthwise thereof; said conveyor means adapted to contain individual pools between the flights over the whole length of the screw; a conduit for solid particles delivering the same to the conveyor means near its lower end; a conduit for wash liquid delivering the same to the conveyor means near its upper end; driving means to rotate the screw at a controllable rate in such direction that the solid particles are moved in upward direction; a discharge for the processed solid particles at the upper end of the conveyor means; a discharge near the lower end of the conveyor means for the wash liquid filtering through the flights of the screw; at least one mixing chamber or pocket communicating with the bottom portion of the housing through a substantially rectangular opening extending with its longitudinal axis substantially parallel to the pitch of the screw; and an impeller within said chamber or pocket.

10. An apparatus for countercurrent washing or refining solid particles such as crystals comprising in combination inclined screw conveyor means including a rotatably mounted cylindrical housing and a ribbon-shaped screw attached to the inner surface thereof, said screw composed of a plurality of flights made of liquid permeable material; said conveyor means adapted to contain separated pools between the flights over the whole length of the screw; a conduit for solid particles delivering the same into the housing near its lower end; a conduit for wash liquid delivering the same into the housing at its upper end; driving means to rotate the housing at a controllable rate in such direction that the solid particles are moved in upward direction; a discharge for the processed solid particles at the upper end of the housing; a discharge near the lower end of the housing for the wash liquid filtering through the flights of the screw; at least one mixing chamber or pocket communicating with the bottom portion of the housing through a substantially rectangular opening extending with its longitudinal axis substantially parallel to the pitch of the screw; and an impeller within said chamber or pocket.

11. An apparatus for countercurrent washing or refining of solid particles such as crystals comprising in combination inclined screw conveyor means including a rotatably mounted screw composed of a plurality of flights made of liquid permeable material, and a housing embracing said screw at least partially to form a trough extending lengthwise thereof; said conveyor means adapted to contain individual pools between the flights over the whole length of the screw; a conduit for solid particles delivering the same to the conveyor means near its lower end; a conduit for wash liquid delivering the same to the conveyor means near its upper end; driving means to rotate the screw at a controllable rate in such direction that the solid particles are moved in upward direction; a discharge for the processed solid particles at the upper end of the conveyor means; a discharge near the lower end of the conveyor means for the wash liquid filtering through the flights of the screw; at least one pump; and a suction piping and a return piping connecting said pump with the bottom portion of the housing; the orifices of said pipings being located on a line parallel to the pitch of the screw.

12. An apparatus for countercurrent washing or refining solid particles such as crystals comprising in combination inclined screw conveyor means including a rotatably mounted cylindrical housing and a ribbon-shaped screw attached to the inner surface thereof, said screw composed of a plurality of flights made of liquid permeable material; said conveyor means adapted to contain separated pools between the flights over the whole length of the screw; a conduit for solid particles delivering the same into the housing near its lower end; a conduit for wash liquid delivering the same into the housing at its upper end; driving means to rotate the housing at a controllable rate in such direction that the solid particles are moved in upward direction; a discharge for the processed solid particles at the upper end of the housing; a discharge near the lower end of the housing for the wash liquid filtering through the flights of the screw; at least one pump; and a suction piping and a return piping connecting said pump with the bottom portion of the housing; the orifices of said pipings being located on a line parallel to the pitch of the screw.

13. An apparatus according to claim 9 wherein the width of the rectangular opening is not greater than the rim of the screw.

14. An apparatus according to claim 11 wherein the diameter of the orifices of the pipings is not greater than the rim of the screw.

References Cited in the file of this patent

UNITED STATES PATENTS

| | | |
|---|---|---|
| 549,097 | Baker | Nov. 5, 1895 |
| 623,892 | Fairley | Apr. 25, 1899 |
| 731,092 | Baker | June 16, 1903 |
| 1,534,737 | Reed | Apr. 21, 1925 |
| 1,609,705 | Forrest | Dec. 7, 1926 |
| 2,012,298 | Berge | Aug. 27, 1935 |
| 2,681,068 | Petit | June 15, 1954 |

FOREIGN PATENTS

| | | |
|---|---|---|
| 237,867 | Great Britain | July 15, 1926 |
| 869,258 | Great Britain | May 31, 1961 |